March 24, 1953 S. O. MORRISON 2,632,566
FILTER CONTROL
Filed Jan. 13, 1949
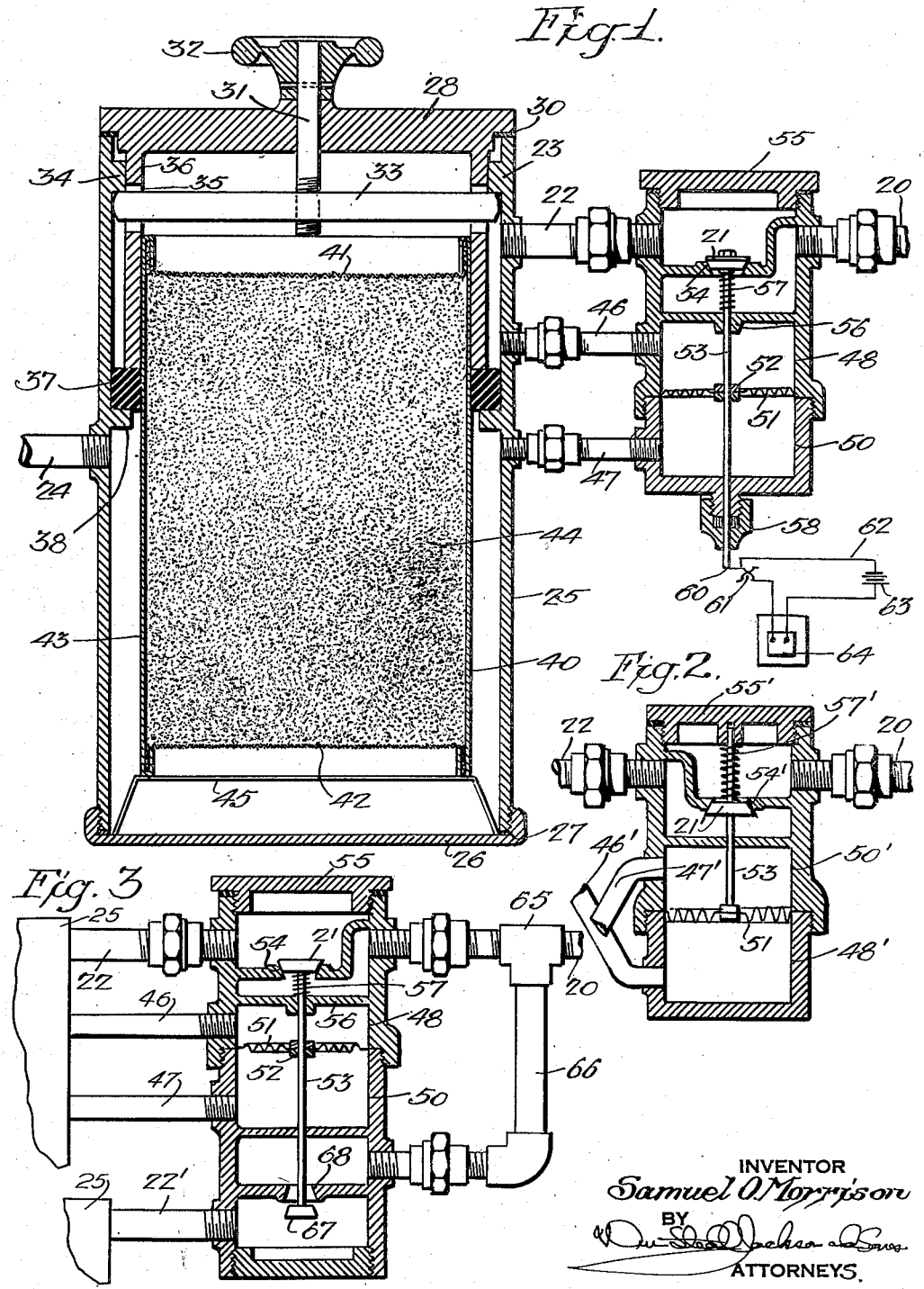
INVENTOR
Samuel O. Morrison
BY
ATTORNEYS Patented Mar. 24, 1953

2,632,566

UNITED STATES PATENT OFFICE 2,632,566

FILTER CONTROL

Samuel O. Morrison, Media, Pa.; Ella P. Morrison, executrix of said Samuel O. Morrison, deceased, assignor to Sunroc Refrigeration Company, Dover, Del., a corporation of Delaware Application January 13, 1949, Serial No. 70,712

1 Claim. (Cl. 210—150)

The present invention relates to fluid filters and controls therefor.

A purpose of the invention is to take a filter out of service automatically when it has completed its campaign.

A further purpose is to replace an unserviceable filter by a serviceable filter automatically as required.

A further purpose is to continuously scan the operating conditions on an individual filter of a filter system in response to the pressure drop across the filter or some equivalent quantity.

A further purpose is to close an inlet valve to a filter when the pressure drop across the filter reaches an excessive value indicating that the filter has become clogged.

A further purpose is to bias a filter inlet valve by a spring toward opening or closing, as the case may be, and to accomplish closing (whether the valve be normally open or normally closed) in response to pressure on a diaphragm, which responds to the pressure drop across the filter.

Further purposes appear in the specification and in the claim.

In the drawings I have chosen to illustrate a few only of the numerous embodiments in which my invention may appear, choosing the forms shown from the standpoints of convenience in illustration, satisfactory operation and clear demonstration of the principles involved.

Figure 1 is a central vertical diagrammatic section of a filter and filter control in accordance with the invention.

Figures 2 and 3 are fragmentary central vertical diagrammatic sections of alternate forms of filter control in accordance with the invention. Figure 3 includes diagrammatic fragmentary showings of the filters.

Describing in illustration but not in limitation and referring to the drawings.

In filters for fluids, particularly liquids, considerable difficulty has been encountered through the continued use of a filter after it has become unserviceable. The unserviceability of the filter may be objectionable from a number of standpoints, as for example because the filter produces a very small effluent compared to its normal effluent, because precipitate which should be removed by filter is allowed to pass through the filter, because filter medium which should remain in the filter contaminates the effluent or for other similar reasons. In any case, it is desirable to take the filter out of service, once it becomes clogged, and the present invention is concerned particularly with automatic means to accomplish this purpose.

One wide field of applicability of the invention is to water filters, especially of the type which filter drinking water supplied from a domestic water supply, and this type of filter has been illustrated in the drawings. However, it will be understood that other types of filters may be employed, and that the invention is applicable to filters for oils, chemical solutions, industrial liquids and fluids of other characters.

Considering first the form of Figure 1, the fluid to be filtered is received through a pipe 20, from which it enters an inlet valve 21 and then passes through a pipe 22 to a filter 23. The effluent or filtrate from the filter is discharged by a pipe 24. While the filter itself may be of any suitable character, I have illustrated a filter constructed according to the principles of the application filed by me jointly with John G. Wehrwein, Serial No. 788,024, filed November 25, 1947, now Patent No. 2,605,901, for Filter for Removable Cartridge.

A cylindrical filter housing 25 is closed at the bottom by a removable bottom cap 26, suitably gasketed at 27 and is closed at the top by a removable top cap 28 gasketed at 30. The top cap is tightened by a screw 31 passing through the cap, suitably gasketed if required, having a handle 32 on the outside and threaded into a tightening bar 33 within the casing which extends across the same and in one angular position engages under lugs 34. The lugs are discontinuous around the interior circumference so that the tightening bar can pass between the lugs for removal of the cap. The tightening bar is locked against rotation independently of the cap but longitudinally movable in slots 35 of a skirt 36 extending downward from the cap 28. The skirt engages at its lower end upon a gasket 37 which is tightened by the pressure of the skirt against a gasket retaining shoulder 38 which runs suitably around the interior circumference of the cylindrical casing.

Within the skirt is a filter cartridge 40 having a suitably porous top 41 and bottom 42, conveniently of screen material, and a tubular outer wall 43 which is sealed by the gasket 37 to prevent flow short circuiting the filter between the inlet and the outlet. A filter medium 44, the detail of which forms no part of the present invention, is contained in the cartridge. As well known the filter medium may consist of activated carbon, sand, diatomaceous earth or any other suitable material which may fill the cartridge continuously or in successive layers of different materials as desired. The cartridge is conveniently supported away from the bottom of the casing by a spring 45.

In order to compare the pressures on the two sides of the filter, a pipe 46 is led off from the inlet connection to the filter and a pipe 47 is similarly in communication with the outlet connection of the filter. The inlet pressure pipe 46 leads to an inlet pressure chamber 48, while the outlet pressure pipe 47 leads to an outlet pressure chamber 50. The two chambers are desirably cylindrical and co-axial as shown. The chambers are separated by a flexible diaphragm 51 which is connected at 52 as by nuts with the stem 53 of valve 21.

The valve stem passes through a seat 54 of the inlet valve, connecting at the respective sides with the pipes 20 and 22 and closed by a cap 55. The valve stem then passes through an opening in a separator wall 56 into the chamber 48. Ordinarily no stuffing box is required at this point. A compression spring 57 urges the valve toward opening from the separator wall.

The valve stem is suitably extended through a stuffing box 58 at the bottom of the chamber 50 and on its lower end carries a movable electric contact 60 which in closed position of the valve completes the circuit with a fixed electrical contact 61 connected by wires 62 in circuit with a source of electric current 63 and an indicator such as an electric bell or electric lamp 64.

In operation, assuming that the valve 21 is open, the filter receives fluid to be filtered through the pipe 20, the valve 21 and the pipe 22, and passes the same through the filter medium, the filtrate leaving by the pipe 24. During this operation, the valve 21 is urged toward opening by the spring 57 and by the pressure of the fluid in the discharge connection of the filter acting on the diaphragm 51 from the chamber 50. At the same time the valve is urged toward closing by the pressure in the inlet connection of the filter acting on the diaphragm 51 from the chamber 48. As the pressure in inlet connection of the filter is at least slightly greater than the pressure in the outlet connection of the filter, the difference in force required to keep the valve open during normal operation of the filter is in this case supplied by the spring 57. When the filter begins to clog, the pressure in the outlet connection of the filter will drop, while at the same time the pressure in the inlet connections may also rise, until a point will be reached at which the force exerted by the spring plus the force exerted by the pressure in the outlet connection of the filter on the diaphragm 51 from the chamber 50 will no longer be adequate to overcome the closing force on the valve exerted by the pressure in the inlet connection of the filter on the diaphragm 51 from the chamber 48. The valve 21 will then close, and at the same time will operate the indicator 64. Thus the filter will automatically be put out of service, and the user will be notified of that fact.

The force of the incoming fluid will have a tendency to hold the valve open and will reduce the required strength of the spring.

In the form of Figure 1, the valve 21 will be open when the device is inactive due to the action of the spring 57. The device may likewise be constructed in such manner that the valve will be closed when the device is inactive and will be opened by the force of the incoming fluid. Thus in Figure 2 the chamber 48' is on the lower side of the diaphragm 51 while the chamber 50' is on the upper side and the pipe 46' from the inlet connection crosses the pipe 47' from the outlet connection. The valve seat 54' is reversed so that the valve seats by upward motion rather than by downward motion. A compression spring 57' urges the valve toward opening by acting against the cap 55'.

In Figure 2 the valve will be urged toward opening by the pressure in the outlet connection acting on the diaphragm 51 from the chamber 50' and by the spring, and will be urged toward closing by the pressure in the inlet connection acting on the diaphragm 51 from the chamber 48'. Otherwise the form of Figure 2 will operate in the same manner as the form of Figure 1.

It may be desirable to connect another filter into the system whenever a given filter is put out of service and this is shown in Figure 3. The inlet pipe 20 is branched at 65 to provide a branch connection 66 extending through a valve 67 (and cooperating valve seat 68) on the stem 53 to a pipe 22' extending to another filter of the character shown in Figure 1. Whenever conditions in the filter of Figure 1 are such as to close the valve 21 the valve 67 automatically opens, since it opens and closes reversely to the valve 21, and permits flow to the filter connected on the pipe 22'. It will be evident that the filter connected to the pipe 22' may similarly be controlled by providing for it complete mechanism interposed between the pipe 22' and the filter as shown in Figure 1, thus providing for cutting off flow through the second filter, operating an indicator or additionally opening up flow to a third filter by the mechanism of Figure 3. The same controls can be extended indefinitely to fourth, fifth and other successive filters in order to protect the operation of the same.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a filter control system, a first filter having an inlet connection and an outlet connection, a second filter having an inlet connection and an outlet connection, the inlet connection to the two filters being common up to a branch point, a valve body having a common stem extending therethrough, a first valve on the common stem interposed in the inlet connection between the branch point and the first filter normally open when the first filter is in normal operation, a second valve opposed to the first valve in opening and closing, mounted on the common stem and in the inlet connection between the branch point and the second filter, normally closed when the first filter is in normal operation, walls forming opposed chambers in the valve body having a common flexible separating wall operatively connected to the common valve stem, a fluid connection from the chamber on the side tending to close the first valve to the inlet connection to the first filter, a fluid connection from the chamber on the side tending to open the first valve to the outlet connection of the first filter and a spring biasing the common valve stem in one direction.

SAMUEL O. MORRISON.

REFERENCES CITED

The following references are of record in the file of this patent:

UNITED STATES PATENTS

| Number | Name | Date |
|---|---|---|
| 391,328 | McTighe | Oct. 16, 1888 |
| 656,043 | Paterson | Aug. 14, 1900 |
| 1,408,822 | Mosher | Mar. 7, 1922 |
| 1,883,805 | Martin et al. | Oct. 18, 1932 |
| 2,183,075 | Hughes | Dec. 12, 1939 |
| 2,359,938 | Quiroz | Oct. 10, 1944 |
| 2,441,526 | Zollinger | May 11, 1948 |
| 2,495,031 | Stovall | Jan. 17, 1950 |